United States Patent
Tashiro et al.

(10) Patent No.: US 10,640,029 B2
(45) Date of Patent: May 5, 2020

(54) WORK VEHICLE

(71) Applicant: Kubota Corporation, Osaka-shi (JP)

(72) Inventors: Kazuyuki Tashiro, Sakai (JP); Kohta Nakao, Sakai (JP)

(73) Assignee: Kubota Corporation, Osaka (JP)

( * ) Notice: Subject to any disclaimer, the term of this patent is extended or adjusted under 35 U.S.C. 154(b) by 217 days.

(21) Appl. No.: 15/583,255

(22) Filed: May 1, 2017

(65) Prior Publication Data

US 2017/0320423 A1    Nov. 9, 2017

(30) Foreign Application Priority Data

May 6, 2016  (JP) .................................. 2016-093323
Jun. 22, 2016 (JP) .................................. 2016-123837

(51) Int. Cl.
*B60P 1/16* (2006.01)
*B60P 1/28* (2006.01)

(52) U.S. Cl.
CPC    *B60P 1/28* (2013.01); *B60P 1/16* (2013.01); *B60P 1/283* (2013.01)

(58) Field of Classification Search
CPC .... B60P 1/28; B60P 1/283; B60P 1/16; G05G 1/44; B60K 26/02

USPC ...................................... 298/1 B, 17 R, 22 R
See application file for complete search history.

(56) References Cited

U.S. PATENT DOCUMENTS

| | | | |
|---|---|---|---|
| 8,499,870 B2 | 8/2013 | Nakamura et al. | |
| 9,316,044 B2 * | 4/2016 | Hemphill | E06B 7/2314 |
| 2015/0084321 A1 | 3/2015 | Hirooka | |
| 2018/0186270 A1 * | 7/2018 | Tsumiyama | B60P 1/28 |

FOREIGN PATENT DOCUMENTS

| | | |
|---|---|---|
| JP | 389948 U | 9/1991 |
| JP | 2006188161 A | 7/2006 |
| JP | 2010143427 A | 7/2010 |
| JP | 201246130 A | 3/2012 |
| JP | 201566992 A | 4/2015 |

* cited by examiner

*Primary Examiner* — Stephen T Gordon
(74) *Attorney, Agent, or Firm* — The Webb Law Firm

(57) ABSTRACT

A work vehicle is provided with a driving section (5), and a load carrying deck (6) disposed rearwardly of the driving section (5). The load carrying deck (6) is configured to be pivotally liftable between an elevated posture in which a front end portion of the deck (6) is elevated, and a lowered posture in which the front end portion of the deck (6) is lowered. Between right and left ends of an upper end portion (61*a*) of a front wall (61) of the load carrying deck (6), there is provided a plate-like elastic member 8 extending forwardly upward.

5 Claims, 8 Drawing Sheets

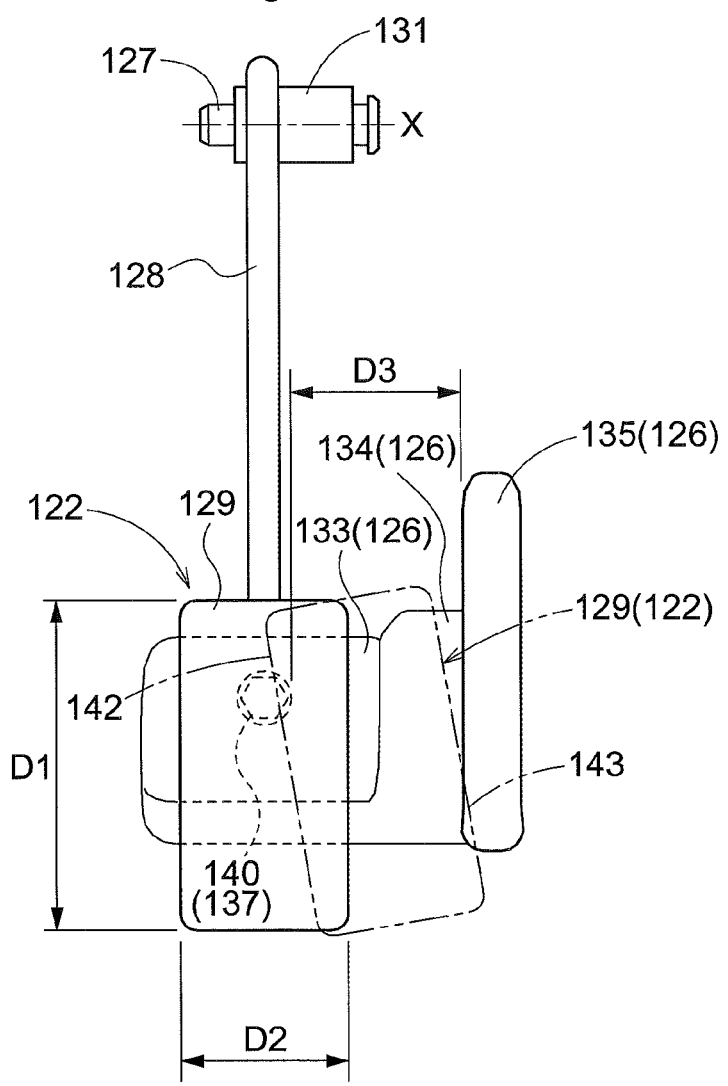

WORK VEHICLE

CROSS-REFERENCE TO RELATED APPLICATIONS

This application claims priority to Japanese Patent Applications No. 2016-093323, filed May 6, 2016 and No. 2016-123837 filed Jun. 22, 2016, the disclosures of which are hereby incorporated in their entirety by reference.

BACKGROUND OF THE INVENTION

1. Field of Invention

This invention relates to a work vehicle such as a multi-purpose work vehicle.

2. Description of the Related Art (1) First Related Art

Among work vehicles, there are known work vehicles such as a multi-purpose vehicle having a load carrying deck at a rear portion (see JP 2015-066992A or US2015/0084321 A1 corresponding thereto). This work vehicle includes a driving section ('a riding section') and a load carrying deck provided rearwardly of the driving section. And, the load carrying deck is configured to be pivotally liftable up/down between an elevated posture (a 'dumping posture') in which a front end portion of the deck is elevated and a lowered posture (a 'loading posture') in which the front end portion of the deck is lowered.

Generally, in the case of the pivotally liftable configuration of the load carrying deck described above, it is necessary to prevent mutual interference between a front wall of the load carrying deck and a rear end portion of the driving section during pivotal lifting up/down of the load carrying deck. In view of this, according to the work vehicle disclosed in JP 2015-066992A (US2015/0084321 A1), a gap is provided between the front wall of the load carrying deck and the rear end portion of the driving section, which gap is intended to prevent interference between the front wall of the load carrying deck and the rear end portion of the driving section.

With the above-described work vehicle, however, there remains room for improvement in the respect of possibility of a load such as straw on the deck jumping forwardly over the front wall of this deck and eventually dropping into the gap between the front wall of the load carrying deck and the rear end portion of the driving section. Namely, there still is a need for a work vehicle having a pivotally liftable load carrying deck, yet effectively resisting the possibility of dropping a load on the deck dropping into the gap between the front wall of the load carrying deck and the rear end portion of the driving section.

(2) Second Prior Art

Among work vehicles, there is also known a work vehicle having a pedal operational tool which includes a pedal arm extending along a front/rear direction and supported to be pivotable about a laterally oriented pivot shaft and a pedal plate attached to a pivotal end portion of the pedal arm to be stepped on for its operation (see eg. JP2010-143427A). The pedal operational tool disclosed in JP2010-143427A includes a stopper portion which comes into contact with a lower face of the pedal plate, thus being capable of restricting of a pivotal angle of the pedal operational tool.

With the above-described pedal operational tool according to the convention, if this pedal operational tool is stepped on for operation while receiving an unintended external force in the lateral direction, the pedal plate may be pivoted downward with a lateral displacement thereof, so that the pedal plate may erroneously advance under an upper end portion of the stopper portion to be inadvertently hooked therewith, thus inhibiting returning of the pedal operational tool to its initial position. Thus, there remains room for improvement in this respect. Then, there is a need for a work vehicle that allows improvement in the respect of operational reliability of the pedal operational tool.

SUMMARY OF THE INVENTION (1) An inventive work vehicle contemplated in view of First Related Art described above, comprises:
a driving section;
a load carrying deck mounted rearwardly of the driving section, the load carrying deck being configured to be pivotally liftable up/down between an elevated posture in which a front end portion of the deck is elevated, and a lowered posture in which the front end portion of the deck is lowered; and
a plate-like elastic member extending forwardly upward from an upper end portion of a front wall of the load carrying deck between right and left ends thereof.

With the above-described arrangement, when a load such as straw loaded on the load carrying deck tends to jump forwardly over the front wall of the load carrying deck, this load will be received and stopped by the plate-like elastic member. And, this load received and stopped by the plate-like elastic member will be guided rearwardly and downwardly along a slope of the plate-like elastic member, thus being returned to the inner side of the load carrying deck. Consequently, inadvertent dropping of the load on the deck into the gap between the front wall of the load carrying deck and the rear end portion of the driving section will occur less likely.

According to one preferred embodiment, the work vehicle further comprises:
a frame member extending in a right/left direction at a rear end portion of the driving section and;
wherein when the load-carrying deck is set under the lowered posture, the plate-like elastic member comes into contact with the frame member to be deformed upward by a reaction force received from the frame member.

With this arrangement, when the load carrying deck is set under the lowered posture, the gap between the front wall of the load carrying deck and the rear end portion of the driving section is covered by the plate-like elastic member. Further, as this plate-like elastic member is deformed upward, a downward elastic force thereof serves to press this plate-like elastic member against the frame member. This ensures gapless contact between the plate-like elastic member and the frame member. Consequently, the accidental dropping of the load into the gap through between the plate-like elastic member and the frame member can be effectively avoided.

According to another preferred embodiment, the front wall of the load carrying deck is formed higher than all of a right wall, a left wall and a rear wall of the load carrying deck.

This arrangement effectively reduces the possibility of the load jumping over the front wall of the load carrying deck. Consequently, the accidental dropping of the load into the gap through between the plate-like elastic member and the frame member can be more effectively avoided.

According to a further preferred embodiment, the upper end portion of the front wall of the load carrying deck extends forwardly upward and the plate-like elastic member is mounted and supported on the upper end portion of the front wall.

This arrangement, though a simple supporting arrangement, allows stable support of the plate-like elastic member by the front end portion of the front wall.

According to a still further preferred embodiment, the work vehicle further comprises an engine;

wherein the engine is mounted downwardly of the load carrying deck.

Even when an engine is disposed adjacent the plate-like elastic member, it is conceived that the plate-like elastic member may be deformed by heat generated from the engine. With the above-described inventive arrangement, the plate-like elastic member and the engine are disposed in separate distribution upwardly and downwardly across the load carrying deck therebetween. This ensures a relatively large distance between the plate-like elastic member and the engine. Whereby, the above-described inconvenience can be readily avoided.

(2) An inventive work vehicle contemplated in view of Second Related Art described above, comprises:

a driving section;

a pedal operational tool including:

a pedal arm extending along a front/rear direction, the pedal arm being supported to be pivotable about a laterally oriented pivot shaft; and a pedal plate attached to a pivotal end portion of the pedal arm to be stepped on for operation;

a stopper portion that comes into contact with a lower face of the pedal plate for restricting a pivotal angle of the pedal operational tool; and an inhibiting portion disposed to be laterally spaced from the stopper portion, the inhibiting portion being configured to inhibit a pivotal movement of the pedal plate more downward than an upper end portion of the stopper portion.

With the above-described arrangement, when the pedal operational tool is stepped on for operation while receiving an unintended external force in the lateral direction, even if the pedal plate is pivoted downwards with a lateral displacement, further downward pivotal movement of the pedal plate beyond the upper end portion of the stopper portion can be prevented by means of the inhibiting portion which is disposed to be laterally spaced from the stopper portion. Consequently, it is possible to avoid the inconvenience that the pedal plate may erroneously advance under an upper end portion of the stopper portion to be hooked therewith, thus inhibiting returning of the pedal operational tool to its initial position. Therefore, with this arrangement, it is possible to improve the operational reliability of the pedal operational tool.

According to one preferred embodiment, the pedal plate includes one lateral end portion adjacent the stopper portion and other lateral end portion adjacent the inhibiting portion; and in a pivotal range of the pedal plate as seen in a side view, the one lateral end portion of the pedal plate is overlapped with the stopper portion and the other lateral end portion of the pedal plate is overlapped with the inhibiting portion.

With the above-described arrangement, in the pivotal direction of the pedal plate, the pedal plate is overlapped with at least one of the stopper portion and the inhibiting portion. Consequently, irrespectively of the manner of possible displacement in the position of the pedal plate, the possibility of the pedal plate advancing more downward than the upper end portion of the stopper portion and getting inadvertently hooked therewith can be avoided advantageously.

According to a further preferred embodiment, a distance in a lateral direction between an upper end portion of the stopper portion and the inhibiting portion is set to a length equal to or shorter than a lateral width of the pedal plate.

When the position of the pedal plate is displaced laterally, this often is accompanied by tilting of the pedal plate. A lateral width occupied by such tilted pedal plate is greater than a lateral width of this pedal plate under its normal state. With the above-described inventive arrangement, by preliminarily setting the distance in the lateral direction between the upper end portion of the stopper portion and the inhibiting portion to a length equal to or shorter than the lateral width of the pedal plate, the possibility of the pedal plate advancing more downward than the upper end portion of the stopper portion and getting inadvertently hooked therewith can be avoided advantageously.

According to a still further preferred embodiment, when the pedal plate is not stepped on for operation, an upper end portion of the inhibiting portion is located closer to a lower face of the pedal plate than an upper end portion of the stopper plate as seen in a side view.

With the above-described inventive arrangement, under a normal state, the pivotal movement of the pedal plate is restricted through contact with the upper end portion of the stopper portion. Whereas, in the event of lateral displacement of the position of the pedal plate, the pivotal movement of the pedal plate is restricted with contact with the upper end portion of the inhibiting portion nearer the stopper portion.

Consequently, by way of a change occurring in the step-on amount of the pedal operational tool, it is possible to make a driver aware of the presence of lateral external force to the pedal operational too.

According to a still further preferred embodiment, the work vehicle further comprises:

a control cable operably coupled with the pedal operational tool;

wherein the inhibiting portion is configured to restrict bending of the control cable.

With the above-described inventive arrangement, the inhibiting portion configured to inhibit a pivotal movement of the pedal plate more downward than an upper end portion of the stopper portion is used also as a restricting member for restricting bending of the control cable operably coupled with the pedal operational tool, so that the arrangement can be simplified.

According to a still further preferred embodiment, the stopper portion comprises a stopper bolt; and the stopper bolt includes: a threaded shaft portion configured to adjust an amount of its projection toward the lower face of the pedal plate; and a head portion fixed to an upper end portion of the threaded shaft portion.

With the above-described inventive arrangement, through adjustment of the height position of the head portion of the stopper bolt, the step-on amount of the pedal operational tool can be readily changed. If the pedal plate advances under the head portion of such stopper bolt, the pedal plate can easily get hooked with the head portion. With the inventive arrangement described above, since the inhibiting portion is provided, such inadvertent hooking of the pedal plate can be avoided advantageously.

According to a still further preferred embodiment, the work vehicle further comprises a steering wheel;

wherein the inhibiting portion is located on more laterally outer side than the pedal plate with respect to a right/left center of the steering wheel.

With the above-described inventive arrangement, when a step-on operation is carried out by a driver remaining seated, there tends to be generated a force that is effective toward the outer side from the right/left center of the driver's body. For this reason, by locating the inhibiting portion on more laterally outer side than the pedal plate with respect to a right/left center of the steering wheel, the inconvenience due to the lateral displacement of the position of the pedal plate can be coped with in a rational manner.

Further and other features and advantageous effects resulting therefrom will become apparent upon reading the following description with reference to the accompanying drawings.

BRIEF DESCRIPTION OF THE DRAWINGS

FIG. 9 is a schematic view showing the pedal operational tool, the stopper portion, the inhibiting portion, etc. and a vicinity thereof, partly showing in section as seen along a pivotal direction of a pedal plate.

DETAILED DESCRIPTION OF PREFERRED EMBODIMENTS

Figure 1:
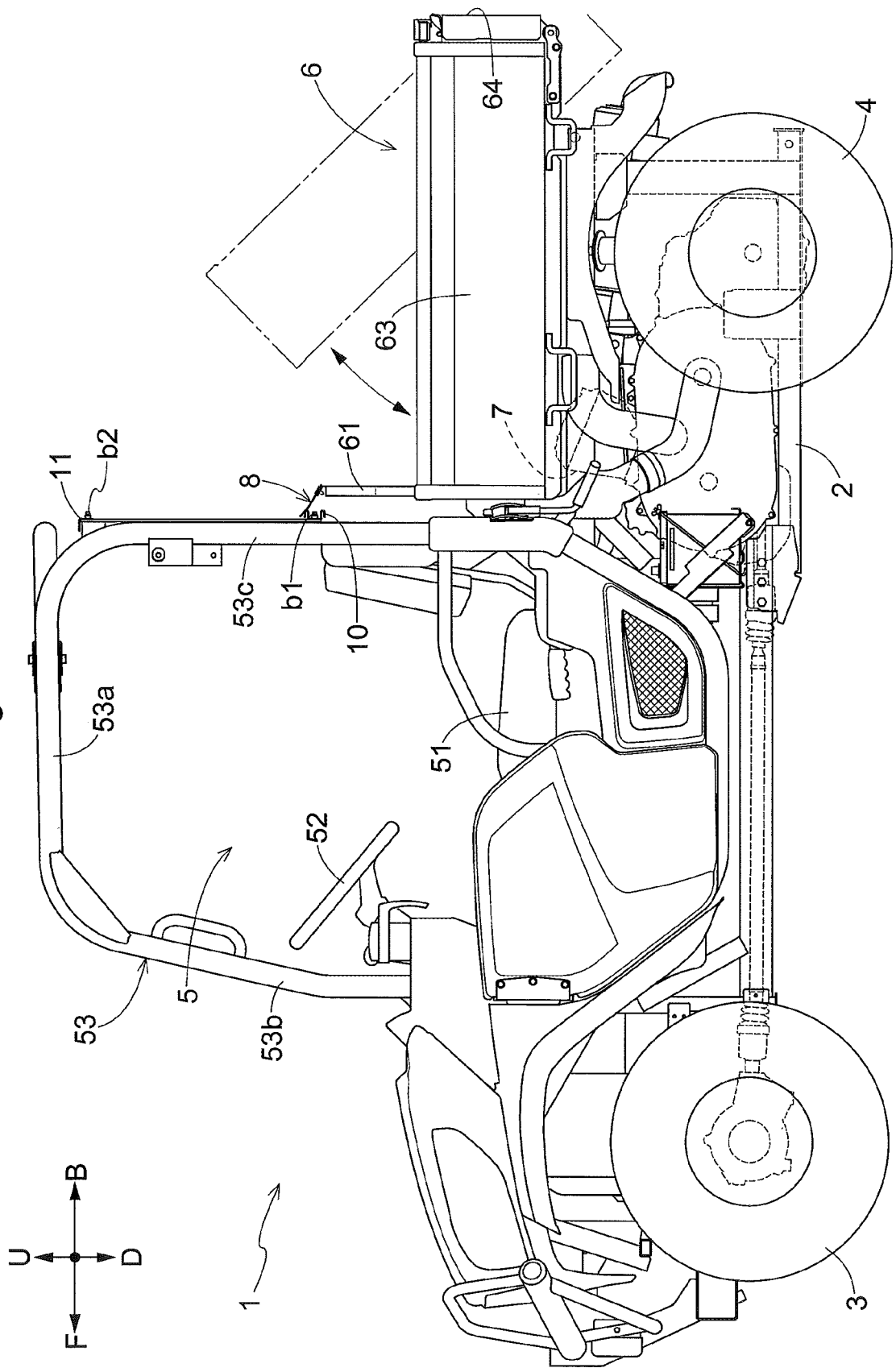
FIG. 1 is a view showing a work vehicle according to a first embodiment (the same applies to the drawings up to FIG. 4) which is a left side view of a multi-purpose vehicle as an example of the work vehicle.
Figure 2:
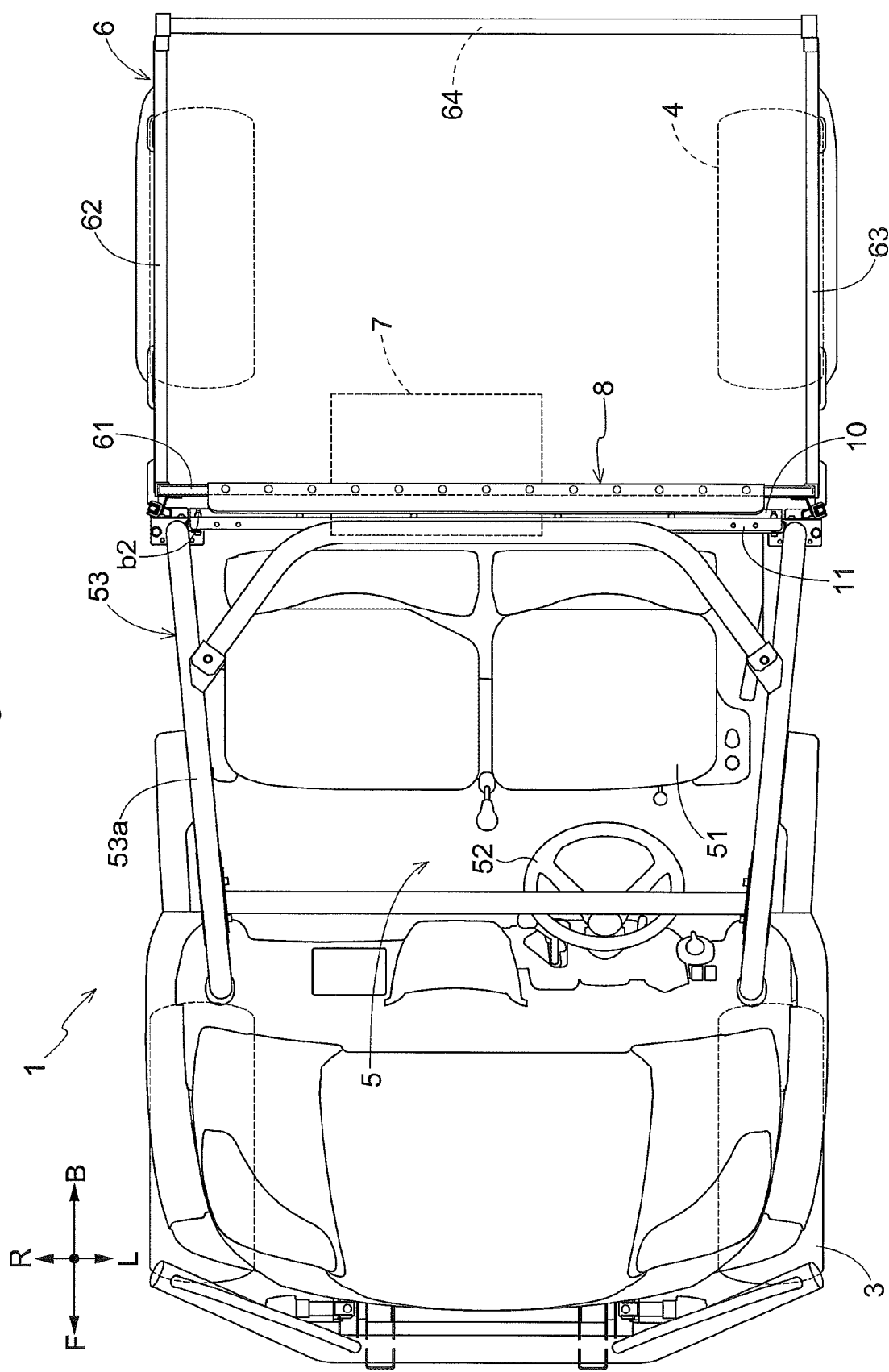
FIG. 2 is a plan view of the work vehicle.

Unless indicated otherwise, in the following discussion, the direction of arrow F shown in FIGS. 1 and 2 represents "front" and the direction of arrow B represents "rear"; and the direction of arrow L represents "left" and the direction of arrow R represents "right". Further, the direction of arrow U shown in FIG. 1 represents "up" and the direction of arrow D represents "down".

First Embodiment

Next, a first embodiment will be described with reference to FIGS. 1 through 4.

[General Arrangement of Work Vehicle]

As shown in FIG. 1, a work vehicle 1 includes a vehicle body frame 2. Under the vehicle body frame 2, there are provided pair of right and left front wheels 3 and a pair of right and left rear wheels 4. The work vehicle 1 can be self-propelled by the pair of right and left front wheels 3 and the pair of right and left rear wheels 4.

As shown in FIGS. 1 and 2, at a front/rear center of the work vehicle 1, a driving section 5 is provided. This driving section 5 includes a driver's seat 51, a steering wheel 52 and a rollover protective structure 53 (to be referred to as 'ROPS 53' hereinafter). Also, rearwardly of the driving section 5, there is provided a load carrying deck 6. This load carrying deck 6 is capable of loading a load such as straw thereon. Downwardly of the load carrying deck 6, an engine 7 is mounted.

As described above, the work vehicle 1 includes the driving section 5, and the load carrying deck 6 provided rearwardly of the driving section 5. And, the engine 7 is mounted under the load carrying deck 6.

As shown in FIG. 1, the load carrying deck 6 is configured to be pivotally liftable up/down between an elevated posture denoted with a virtual line and a lowered posture denoted with a solid line. Under the elevated posture, a front end portion of the load carrying deck 6 is elevated, whereby the deck 6 is tilted forwardly upward. Whereas, under the lowered posture, the front end portion of the load carrying deck is lowered, whereby the deck 7 is disposed horizontally.

In this way, the load carrying deck 6 is configured to be pivotally liftable up/down between the elevated posture in which the front end portion of the deck 6 is elevated and the lowered posture in which the front end portion of the deck 6 is lowered.

[Arrangement of the ROPS]

As shown in FIG. 1 and FIG. 2, the ROPS 53 includes an upper frame body 53a, a pair of right and left front struts 53b, and a pair of right and left rear struts 53c. The pair of right and left front struts 53b and the pair of right and left rear struts 53c respectively extend along the vertical direction, and the upper frame body 53a is supported by the pair of right and left front struts 53b and the pair of right and left rear struts 53c.

Further, between the left rear strut 53c and the right rear strut 53c, there are provided a lower frame member 10 and an upper frame member 11. The lower frame member 10 and the upper frame member 11 respectively extend along the right/left direction. Further, the lower frame member 10 is disposed downwardly of the upper frame member 11.

Incidentally, the pair of right and left rear struts 53c are located at the rear end of the driving section 5; and the lower frame member 10 corresponds what is referred to as "a frame member" related to the present disclosure. Namely, at the rear end portion of the driving section 5, there is provided a frame member that extends along the right/left direction.

Figure 3:
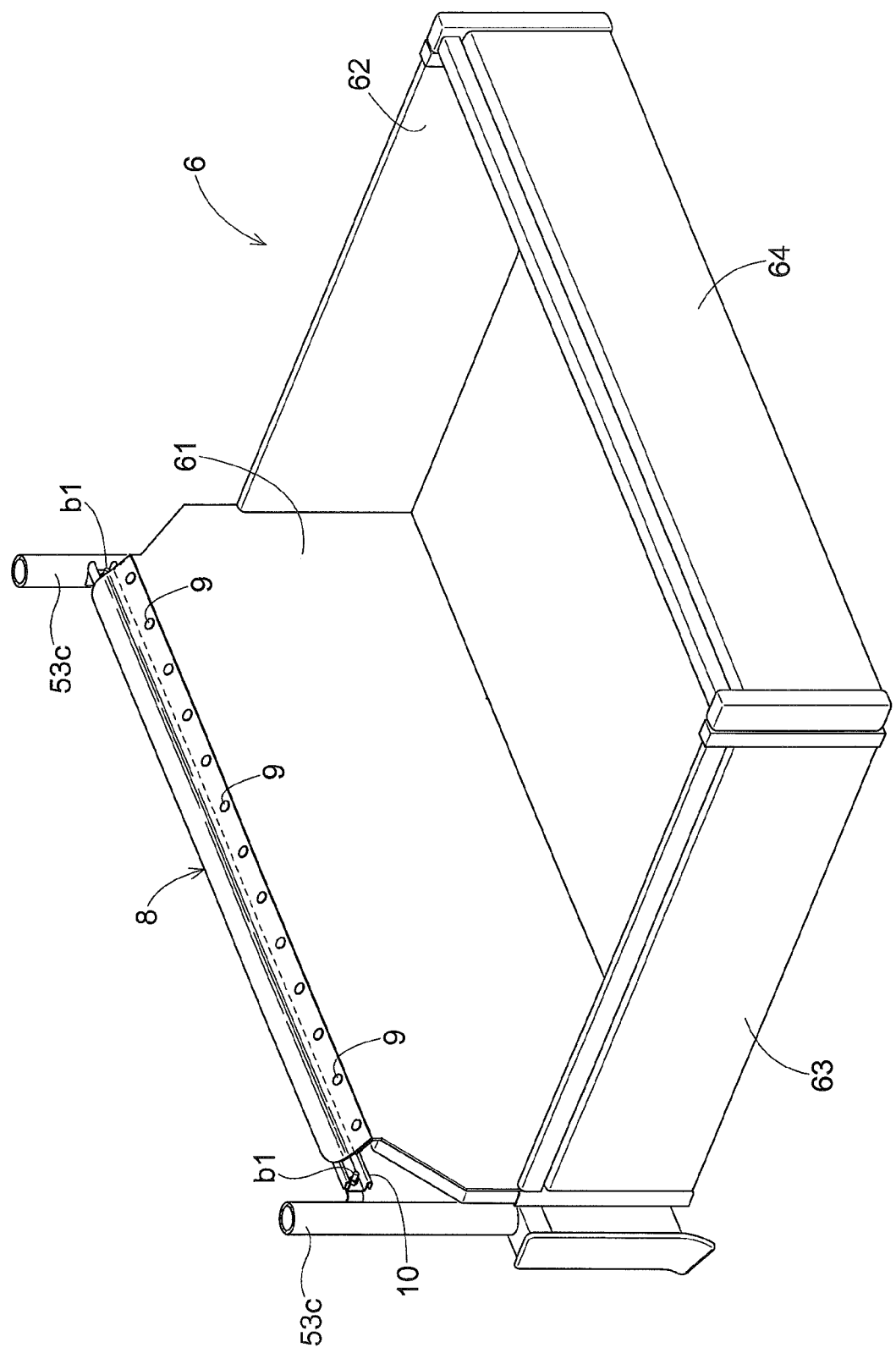
FIG. 3 is a perspective view showing an arrangement of a load carrying deck and a plate-like elastic member as seen from a left rear side of the vehicle body.
Figure 4:
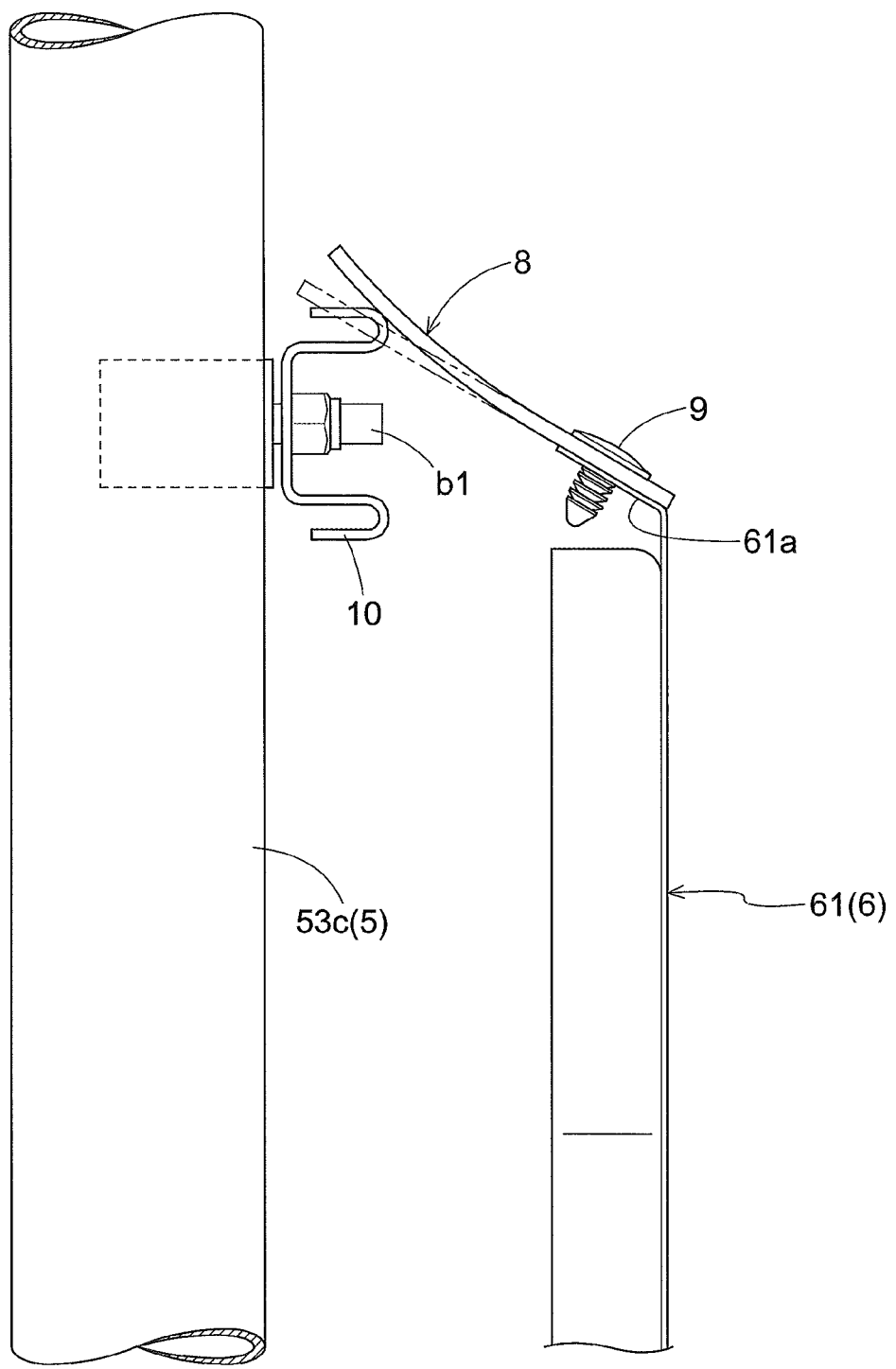
FIG. 4 is a left side view showing the arrangement of the load carrying deck and the plate-like elastic member.

The lower frame member 10 and the upper frame member 11 are attached to the pair of right and left rear struts 53c from the rear side thereof. As shown in FIG. 1, FIG. 3 and FIG. 4, the lower fame member 10 is fastened to the pair of right and left rear struts 53c with bolts b1. Also, as shown in FIG. 1 and FIG. 2, the upper frame member 11 is fastened to the pair or right and left rear struts 53c with bolts b2.

[Arrangement of Load Carrying Deck and Plate-Like Elastic Member]

As shown in FIGS. 1 through 3, the load carrying deck 6 includes a front wall 61, a right wall 62, a left wall 63 and a rear wall 64. And, the front wall 61 has a height which is greater than all of those of the right wall 62, the left wall 63 and the rear wall 64 of the load carrying deck 6.

As shown in FIG. 4, the upper end portion 61a of the front wall 61 is provided to extend forwardly upward. And, on the upper end portion 61a of the front wall 61, a plate-like elastic member 8 is mounted and supported. This plate-like elastic member 8 has a rectangular shape (elongated strip shape) and is formed of e.g. rubber plate having elasticity.

As shown in FIG. 3 and FIG. 4, the plate-like elastic member 8 is fixed to the upper end portion 61a of the front wall 61 via a plurality of fixing pins 9. Further, as shown in FIG. 2 and FIG. 3, this plate-like elastic member 8 is provided between and across right and left end portions of the upper end portion 61a of the front wall 61. And, the plate-like elastic member 8 extends forwardly upward.

As described above, the plate-like elastic member 8 extends forwardly upward the upper end portion 61a of the front wall 61 of the load carrying deck 6 between right and left ends of the upper end portion 61a. And, the plate-like elastic member 8 is mounted and supported on the upper end portion 61a of the front wall 61.

As shown in FIG. 3 and FIG. 4, when the load-carrying deck 6 is under the lowered posture, the plate-like elastic member 8 is placed in contact with the lower frame member 10. Under this state, the plate-like elastic member 8 is subjected to a reaction force from the lower frame member 10. And, by this reaction force, the plate-like elastic member 8 is deformed upward. Incidentally, in FIG. 4, the shape of the plate-like elastic member 8 under its non-deformed state is shown by a virtual line, whereas the shape of the upwardly deformed plate-like elastic member 8 is shown by a solid line.

The tilt and the position of the plate-like elastic member 8 along the vertical direction are set such that when the load carrying deck 6 assumes the lowered posture, the plate-like elastic member 8 comes into contact with the lower frame member 10, thus being deformed upward. Incidentally, the tilt and the position of the plate-like elastic member 8 along the vertical direction can be adjusted at the time of designing by varying the tilt and the vertical position of the upper end portion 61a of the front wall 61.

In this way, when the load carrying deck 6 is under the lowered posture, the plate-like elastic member 8 is placed in contact with the frame member (lower frame member 10 in this embodiment) and is deformed upward by the reaction force received therefrom.

According to the arrangement described above, when load such as straw loaded on the load carrying deck 6 tends to jump forwardly over the front wall 61 of the load carrying deck 6, this load will be received and stopped by the plate-like elastic member 8, so that this load received and stopped by the plate-like elastic member will be guided downwards along the slope of the plate-like elastic member 8 rearwards, thus eventually returned to the inner side of the load carrying deck 6. As a result, according to the present disclosure, dropping of load on the load carrying deck 6 into a gap between the front wall 61 of the load carrying deck 6 and the rear end portion of the driving section 5 will occur less likely.

Modified Embodiments of First Embodiment

Next, modified embodiments of the first embodiment will be described. The respective embodiments described below can be applied in any desired combination(s) with the foregoing embodiment, as long as no contradiction results from such combination(s). It is understood that the scope of the present invention is not limited to the contents of these embodiments.

(1) A mesh or net-like member can be provided between the left rear strut 53c and the right rear strut 53c. In this case, it is possible to employ an arrangement that the upper frame member 11, an upper end portion of the mesh-like member and the pair of right and left rear struts 53c will be fastened together with the bolts b2; and the lower frame member 10, a lower end portion of the mesh-like member and the pair of right and left rear struts 53c will be fastened together with the bolts b1, for instance.

(2) The upper frame member 11 can be omitted.

(3) The lower frame member 10 can be omitted.

(4) The ROPS 53 can be omitted.

(5) The engine 7 can be disposed at a position other than the position under the load carrying deck 6. As such position other than the position under the load carrying deck 6, it is possible to employ e.g. a vehicle body front portion of the work vehicle 1, a position under the driver's seat 51, etc.

(6) As the power source for the work vehicle 1, a motor can be provided instead of the engine 7.

(7) The upper end portion 61a of the front wall 61 can be provided to extend directly upward, i.e. vertically. In this case, instead of the plate-like elastic member 8 provided in the foregoing embodiment, it is possible to employ a plate-like elastic member (not shown) having a plate-like fixing portion under a posture along the vertical direction and a plate-like tilted portion extending forwardly upward from the upper end of the fixing portion, for instance. And, as the fixing portion of this plate-like elastic member is fixed to a front face or a rear face of the upper end portion 61a of the front wall 61, the plate-like elastic member can be caused to extend forwardly upward.

(8) The load carrying deck 6 may not be disposed horizontal under the lowered posture. For instance, it is possible to employ an arrangement, wherein under its lowered posture, the load carrying deck 6 is tilted upward at a front portion thereof and from this posture, in association with rising of the front end portion of the load carrying deck 6, the deck is shifted into the elevated posture with large forward upward tilt.

(9) In the foregoing embodiment, a multi-purpose vehicle for two passengers was disclosed as an example of work vehicle 1, but this is not limitative. Instead thereof, a work vehicle according to the present disclosure can be a multi-purpose vehicle having two, front and rear, rows of seats for four passengers or other type of work vehicle having a load carrying deck.

Second Embodiment

Next, a work vehicle according to a second embodiment will be described with reference to FIGS. 5-9.

Figure 5:
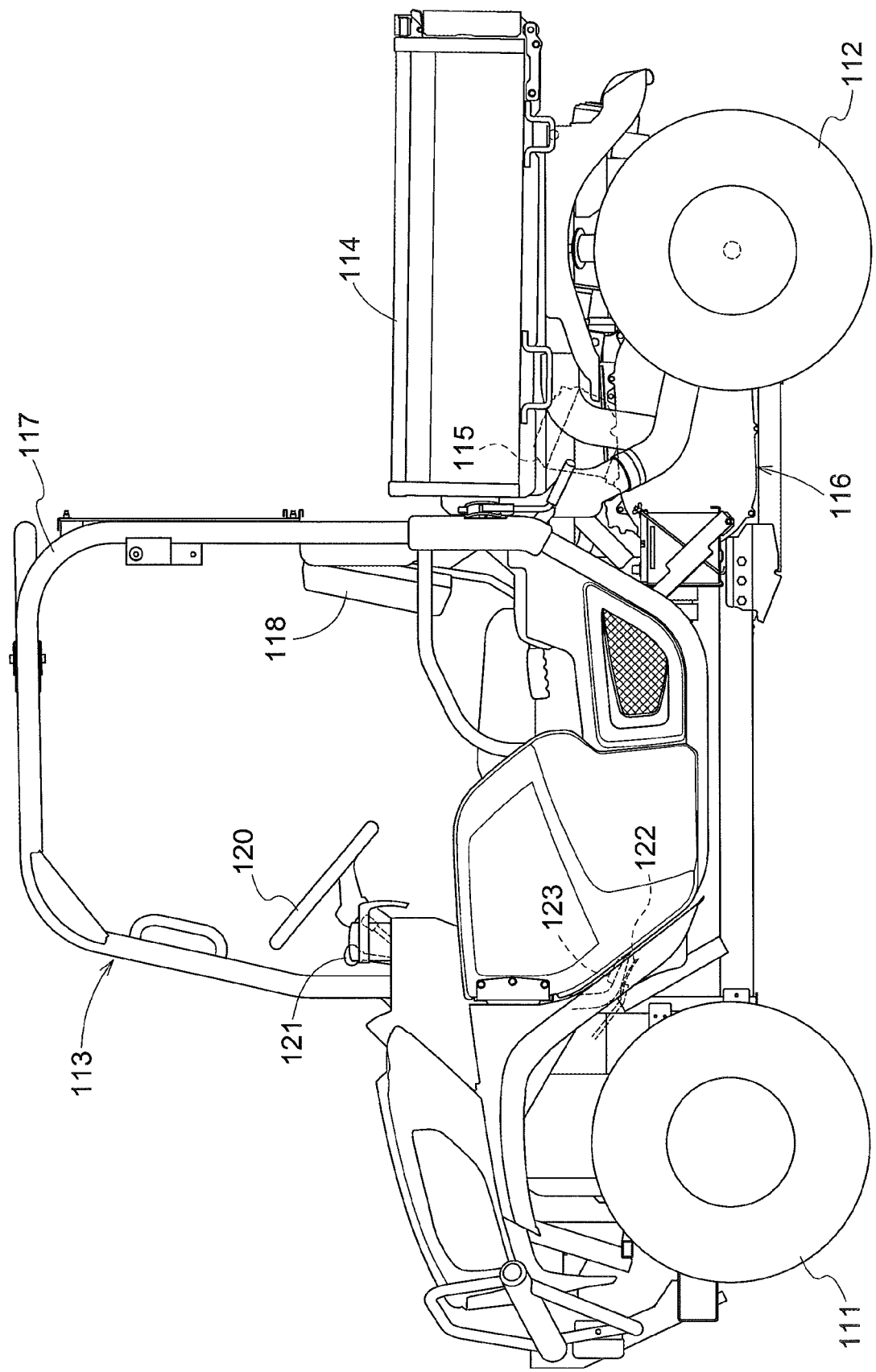
FIG. 5 is a view showing a work vehicle according to a second embodiment (the same applies to the drawings up to FIG. 9) which is a left side view of a multi-purpose vehicle as an example of the work vehicle.

A multi-purpose work vehicle (an example of 'work vehicle') shown in FIG. 5 is configured as a vehicle usable for a variety of uses such as load transportation, recreation, etc. The multi-purpose vehicle includes a pair of right and left front wheels 111 as a drivable and steerable traveling device and a pair of right and left rear wheels 112 as a drivable traveling device. Namely, the multi-purpose vehicle is configured to be capable of traveling by means of the pair of right and left front wheels 111 and the pair of right and left rear wheels 112. At a center portion of the traveling vehicle body, there is provided a driving section 113 where a driver is to be seated for effecting a driving operation. At a rear portion of the traveling vehicle body, there is provided a load carrying deck 114 capable of loading a load thereon. Downwardly of the load carrying deck 114 in the traveling vehicle body, there is provided an engine portion 116 having e.g. a water-cooled gasoline engine (to be referred to as 'engine' for short, hereinafter).

Figure 6:
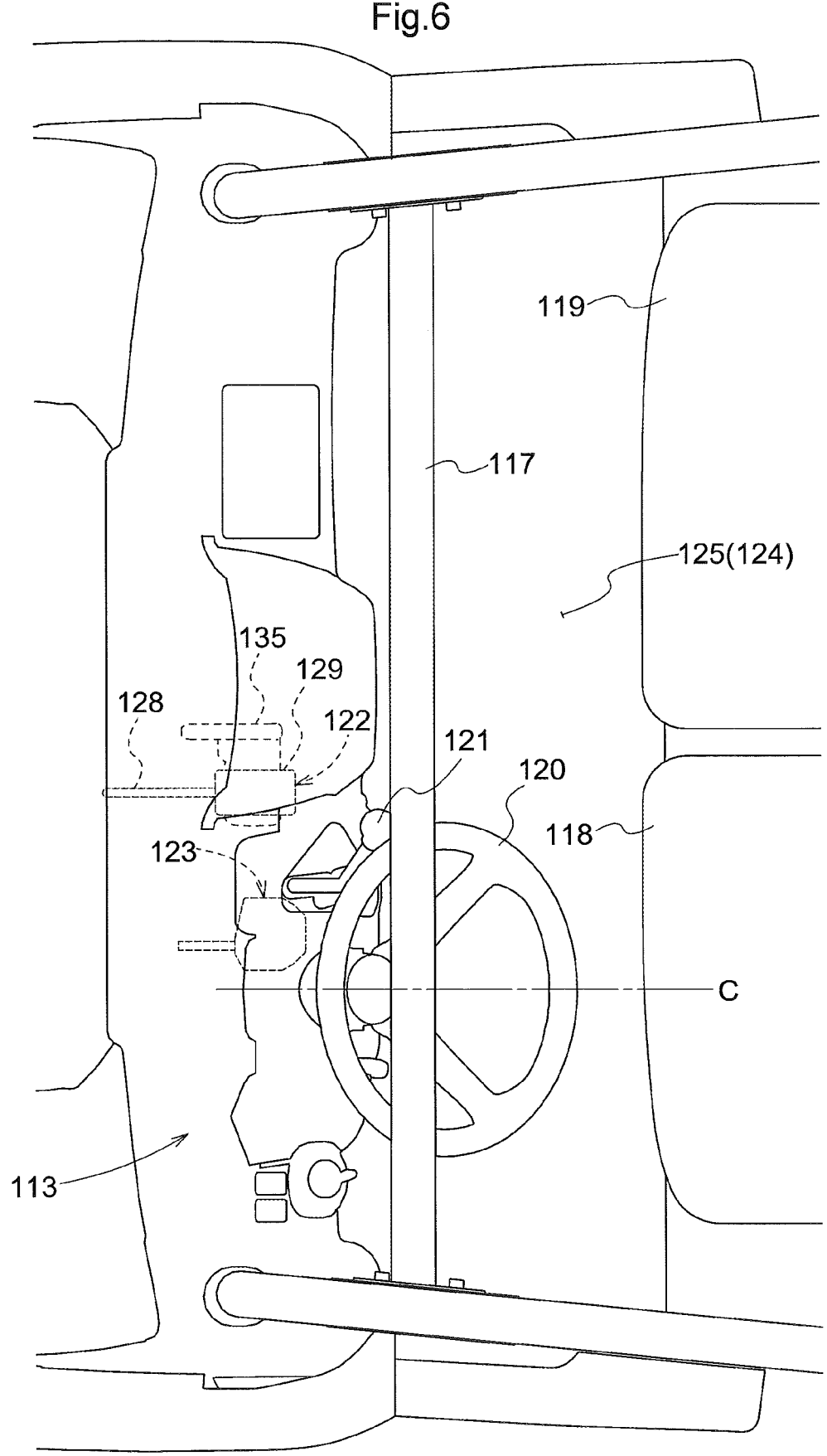
FIG. 6 is a plan view showing a driving section and a vicinity thereof.

As shown in FIG. 5 and FIG. 6, the driving section 113 is protected as being surrounded by a frame-like ROPS (ROPS frame or rollover protective structure frame) 117. In the driving section 113, there are provided a driver's seat 118 where the driver is to be seated and an auxiliary seat 119 where a passenger is to be seated. Further, in the driving section 113, there are also provided a steering wheel 120 for steering the right and left front wheels 111, a speed changing lever 121 for speed changing operations, an accelerator pedal 122 (an example of 'pedal operational tool') capable of changing a traveling speed, a brake pedal 123 capable of braking the traveling vehicle body, and so on.

Figure 7:
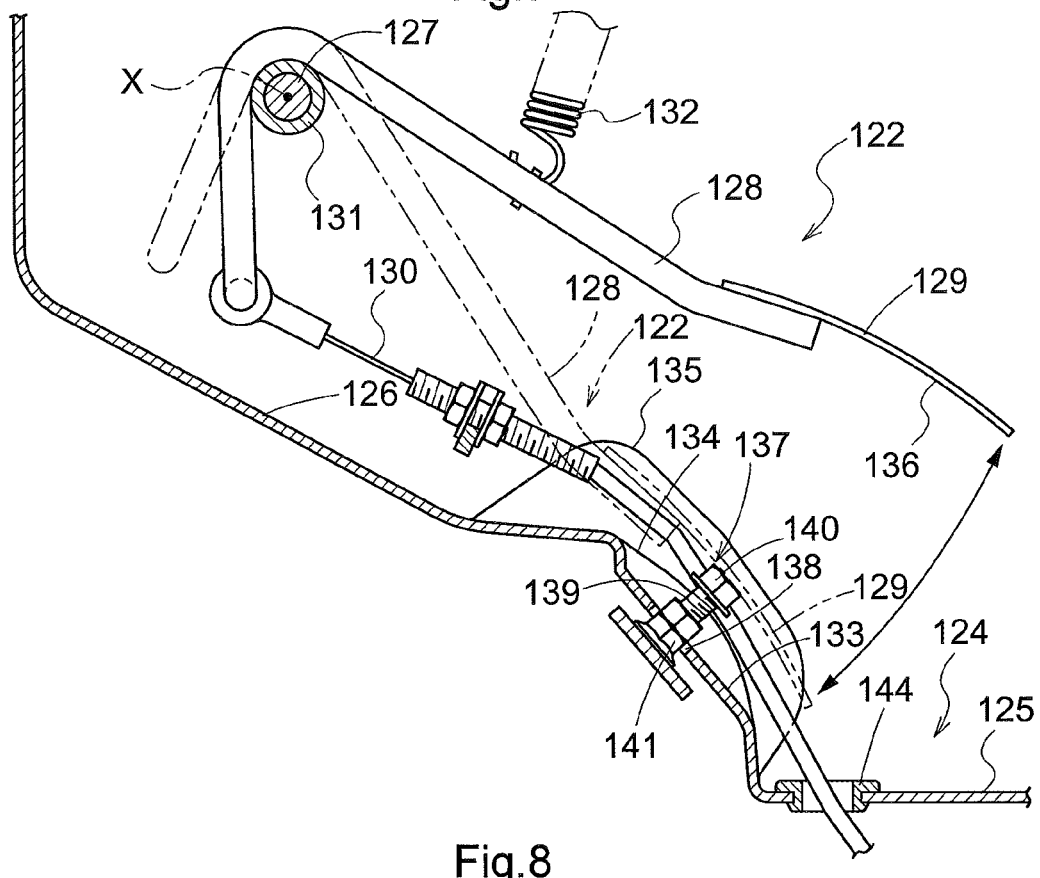
FIG. 7 is a left side view showing a pedal operational tool, a stopper portion, an inhibiting portion, etc. and a vicinity thereof, partly showing in section.
Figure 8:
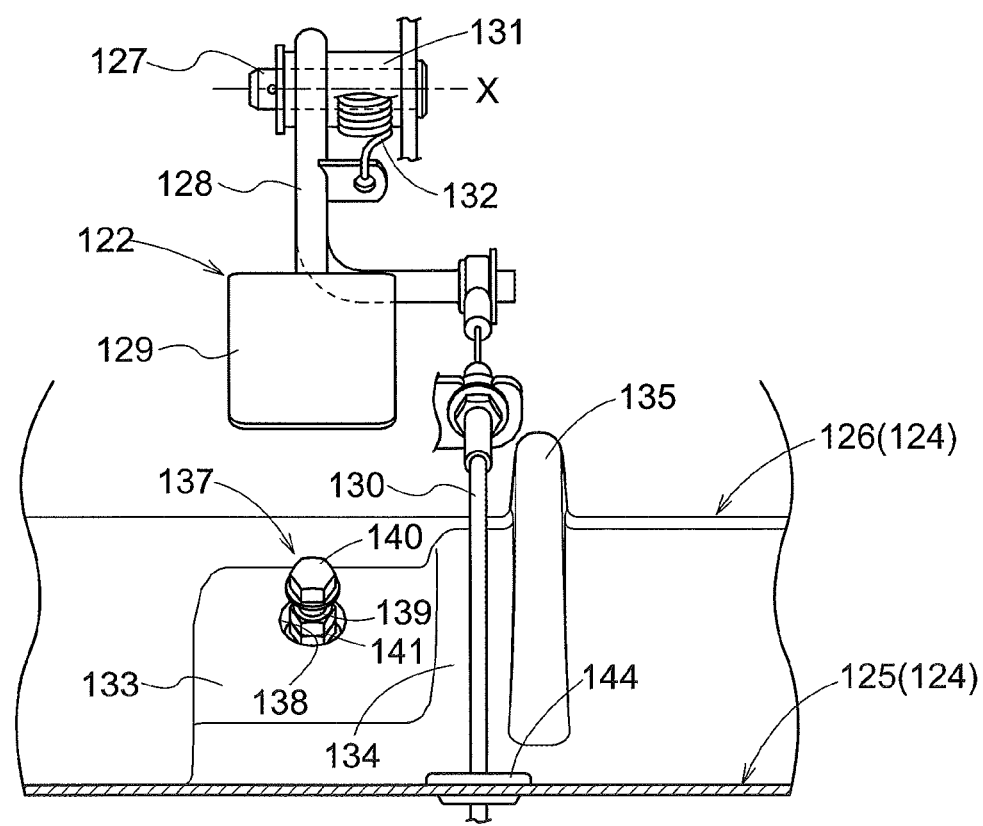
FIG. 8 is a rear view showing the pedal operational tool, the stopper portion, the inhibiting portion, etc. and a vicinity thereof, partly showing in section.

Further, as shown in FIGS. 6 through 8, in the driving section 113, there is provided a plate-like panel member 124. This panel member 124 includes a foot panel portion 125 where the passenger's foot is placed, and a front side panel portion 126 formed continuously from the front end portion of the foot panel portion 125.

[Accelerator Pedal]

As shown in FIGS. 7 through 9, the accelerator pedal 122 includes a pedal arm 128 which is pivotally supported on a laterally oriented pivot shaft 127 (a pivot axis X extending centerally of the pivot shaft 127) and which extends along the front/rear direction, and a pedal plate 129 attached to a pivotal end portion of the pedal arm 128 to be stepped on. The pivot shaft 127 is fixedly supported by a support member (not shown) of the traveling vehicle body. The pivot shaft 127 is disposed more upward than the foot panel portion 125. Namely, the accelerator pedal 122 is configured as a suspension type pedal.

As shown in FIGS. 7 through 9, the pedal arm 128 comprises a rod-like member. The pedal arm 128 has a shape which is bent into an approximately L-shape as seen in a side view. The pedal plate 129 is attached to one pivotal end portion of the pedal arm 128, and one end of a control cable 130 is attached to the other pivotal end portion of the pedal arm 128. An intermediate portion of the pedal arm 128 is fixed to a cylindrical boss member 131 which is supported on the pivot shaft 127 to be rotatable relative thereto.

The other end of the control cable 130 is operably coupled to a control device (not shown) for controlling a rotational speed of an engine 115.

As shown in FIG. 9, etc., the pedal plate 129 is a rectangular-shaped plate member. The pedal plate 129 has a front/rear width D1 which is longer than a lateral width D2.

As shown in FIG. 7 and FIG. 8, the accelerator pedal 122 is provided with an urging member 132 comprised of e.g. a spring member, configured to urge the accelerator pedal 122 to be returned to its initial position (non-stepped-on position). The urging member 132 is attached to the pedal arm 128.

As shown in FIGS. 7 through 9, the front side panel portion 126 includes: a pedal lower portion 133 which is disposed downwardly of the pedal plate 129 under its normal state; a cable lower portion 134 which is disposed downwardly of the control cable 130; and an inhibiting portion 135 extending along the front/rear direction. The pedal lower portion 133, the cable lower portion 134 and the inhibiting portion 135 have, in this mentioned order, progressively increasing heights at their respective upper end portions. Namely, the front side panel portion 126 has a stepped arrangement. The cable lower portion 134 is formed continuously from the lateral outer side of the pedal lower portion 133. The inhibiting portion 135 is formed continuously from the later outer side of the cable lower portion 134 and ridged upward.

[Stopper Portion]

As shown in FIGS. 7 through 9, in the driving section 113, there is provided a stopper portion 137 which comes into contact with a lower face 136 of the pedal plate 129, thus being capable of restricting a pivotal angle of the accelerator pedal 122. The stopper portion 137 is disposed to project upward through a through hole 138 defined in the pedal lower portion 133. The stopper portion 137 comprises a stopper bolt including a threaded shaft portion 139 configured to adjust an amount of its projection toward the pedal plate 129 relative to the pedal lower portion 133, and a head portion 140 fixed to an upper end portion of the threaded shaft portion 139. With the stopper bolt, by operating a double nut 141 comprised of two nuts attached to the threaded shaft portion 139, the projection amount of the threaded shaft portion 139 is varied, whereby the height position of the head portion 140 can be changed. With this, the step-on amount of the pedal plate 129 of the accelerator pedal 122 can be readily changed.

[Inhibiting Portion]

As shown in FIG. 8, FIG. 9, etc., the inhibiting portion 135 is disposed to be laterally spaced from the stopper portion 137, the inhibiting portion being configured to inhibit a pivotal movement of the pedal plate 129 more downward than an upper end portion of the stopper portion 137. As described above, the inhibiting portion 135 is formed integrally formed as a part of the panel member 124.

As shown in FIG. 6, the inhibiting portion 135 is located on a more lateral outer side than the pedal plate 129 relative to a right/left center C of the steering wheel 120 operated by the driver seated at the driver's seat 118. On the side closer to the right/left center C of the steering wheel 120 than the pedal plate 129, no members/components are present that restricts the pivotal movement of the pedal plate 129. Thus, there is secured a large foot space available for the driver seated at the driver's seat 118.

As shown in FIG. 7, etc., in the pivotal direction of the accelerator pedal 122, the upper end portion of the inhibiting portion 135 is disposed closer to the lower face 136 of the pedal plate 129 than the upper end portion of the stopper portion 137. Namely, when the pedal plate 129 is at its non-stepped-on initial position, as seen in a side view, the upper end portion of the inhibiting portion 135 is disposed at a position closer to the lower face 136 of the pedal plate 129 than the upper end portion of the stopper portion 137.

As shown in FIG. 9, a distance D3 in the lateral direction between the upper end portion of the stopper portion 137 and the inhibiting portion 135 is set to a length which is equal to a lateral width D2 of the pedal plate 129.

As indicated by a two-dot chain line in FIG. 9, an arrangement is provided such that when the pedal plate 129 of the accelerator pedal 122 is displaced in the lateral direction, one lateral end portion 142 of the pedal plate 129 and the head portion 140 of the stopper portion 137 are overlapped with each other in the pivotal direction of the peal plate 129, and also the other lateral end portion 143 of the pedal plate 129 and the inhibiting portion 135 are overlapped with each other in the pivotal direction of the pedal plate 129.

Therefore, the pedal plate 129 is inhibited from passing under between the head portion 140 of the stopper portion 137 and the inhibiting portion 135.

As may be understood from FIG. 7 and FIG. 8, the inhibiting portion 135 is configured to restrict bending to the lateral outer side of the control cable 130 operably coupled to the accelerator pedal 122. The control cable 130 is caused to pass through a through hole 144 defined in the foot panel portion 125 and then guided from the lower side of the foot panel portion 125 toward the control device (not shown).

With provision of such inhibiting portion 135 described above, inadvertent hooking of the accelerator pedal 122 to a lower portion of the head portion 140 of the stopper bolt is avoided, so that the operator can operate the accelerator pedal 122 easily.

Modified Embodiments of Second Embodiment

Next, modified embodiments of the second embodiment will be described.

The respective embodiments described below can be applied in any desired combination(s) with the foregoing embodiment, as long as no contradiction results from such combination(s). It is understood that the scope of the present invention is not limited to the contents of these embodiments.

(1) In the foregoing embodiment, the accelerator pedal 122 was disclosed as an example of 'pedal operational tool', but this is not limitative. The 'pedal operational tool' can be a brake pedal 123 also.

(2) In the foregoing embodiment, there was disclosed the arrangement in which the distance D3 between the upper end portion of the stopper portion 137 and the inhibiting portion 135 is set to a length which is equal to the lateral width D2 of the pedal plate 129, but this is not limitative. Instead, the distance D3 in the lateral direction between the upper end portion of the stopper portion 137 and the inhibiting portion 135 may be set to a length which is shorter than the lateral width D2 of the pedal plate 129, for instance. Namely, it is advantageous if the distance D3 in the lateral direction between the upper end portion of the stopper portion 137 and the inhibiting portion 135 is set to a length equal to or shorter than the lateral width D2 of the pedal plate 129. Further alternatively, the distance D3 in the lateral direction between the upper end portion of the stopper portion 137 and the inhibiting portion 135 may be set to a length which is longer than the lateral width D2 of the pedal plate 129.

(3) In the foregoing embodiment, there was disclosed the arrangement in which in the pivotal direction of the accelerator pedal 122 (the pivotal range as seen in a side view), the upper end portion of the inhibiting portion 135 is disposed closer to the lower face 136 of the pedal plate 129 than the upper end portion of the stopper portion 137, but this is not limitative. For instance, the upper end portion of the inhibiting portion 135 may be located at a position of same distance (same height) as the upper end portion of the stopper portion 137. Further alternatively, in the pivotal direction of the accelerator pedal 122, the upper end portion of the inhibiting portion 135 may be disposed farther from the lower face 136 of the pedal plate 129 than the upper end portion of the stopper portion 137.

(4) In the foregoing embodiment, there was disclosed the arrangement in which the inhibiting portion 135 is configured to restrict bending of the control cable 130 operably coupled to the accelerator pedal 122, but this is not limitative. For instance, the inhibiting portion 135 may be provided without the function of restricting bending of the control cable 130 operably coupled with the accelerator pedal 122.

(5) In the foregoing embodiment, as an example of the stopper portion 137, one comprising a stopper bolt was disclosed, but this is not limitative. Instead, it is also possible to employ, as a modified stopper portion, e.g. a projecting body having no function of restricting bending of the control cable and projecting from a floor panel.

(6) In the foregoing embodiment, there was disclosed the arrangement in which the inhibiting portion 135 is disposed only on the laterally outer side than the pedal plate 129, relative to the right/left center C of the steering wheel 120, but this is not limitative. In addition to this inhibiting portion 135, another inhibiting portion may be disposed on the side closer to the right/left center C of the steering wheel 120 than the pedal plate 129.

(7) In the foregoing embodiment, there was shown the arrangement in which the inhibiting portion 135 is integrally formed as a part of the panel member 124, but this is not limitative. For instance, the inhibiting portion 135 can be a member which is separate from the panel member 124 and which is attached to the panel member 124. Further, the shape of the inhibiting portion 124 can vary as desired.

(8) In the foregoing embodiments, multi-purpose vehicles were disclosed as the work vehicle. The invention is not limited thereto. The work vehicle can be a variety of work vehicle such as a tractor, a grass mower, a combine, a rice planting machine, a civil engineering work machine, etc.

What is claimed is:

1. A work vehicle comprising:
a driving section;
a load carrying deck mounted rearwardly of the driving section, the load carrying deck being configured to be pivotally liftable up/down between an elevated posture in which a front end portion of the deck is elevated, and a lowered posture in which the front end portion of the deck is lowered;
a plate-like elastic member extending forwardly upward from an upper end portion of a front wall of the load carrying deck between right and left ends thereof; and
a frame member extending in a right/left direction at a rear end portion of the driving section,
wherein when the load-carrying deck is set under the lowered posture, the plate-like elastic member comes into contact with the frame member and is set under an inclined posture in which the inclination of the plate-like elastic member is increased forward so as to guide a load of the load-carrying deck received by the plate-like elastic member to an inner side of the load carrying deck along the inclination.

2. The work vehicle of claim 1, wherein the front wall of the load carrying deck is formed higher than all of a right wall, a left wall and a rear wall of the load carrying deck.

3. The work vehicle of claim 1, wherein:
the upper end portion of the front wall of the load carrying deck extends forwardly upward; and
the plate-like elastic member is mounted and supported on the upper end portion of the front wall.

4. The work vehicle of claim 1, further comprising:
an engine;
wherein the engine is mounted downwardly of the load carrying deck.

5. The work vehicle of claim 1, wherein:
the front wall has a planar part expanding planarly in a vertical direction and an extending part extending forward and upward from an upper end portion of the planar part;
the plate-like elastic member is mounted and supported on the extending part; and a lower end portion of the plate-like elastic member is arranged at a position corresponding to the upper end portion of the planar part.

\* \* \* \* \*